United States Patent
Rico Alvarino et al.

(10) Patent No.: US 12,166,597 B2
(45) Date of Patent: * Dec. 10, 2024

(54) SUBFRAME VALIDITY AND SYSTEM INFORMATION RECEPTION FOR MACHINE TYPE COMMUNICATION

(71) Applicant: QUALCOMM Incorporated, San Diego, CA (US)

(72) Inventors: Alberto Rico Alvarino, San Diego, CA (US); Peter Gaal, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 505 days.

This patent is subject to a terminal disclaimer.

(21) Appl. No.: 17/327,547

(22) Filed: May 21, 2021

(65) Prior Publication Data

US 2021/0281434 A1 Sep. 9, 2021

Related U.S. Application Data

(63) Continuation of application No. 15/646,018, filed on Jul. 10, 2017, now Pat. No. 11,044,111.

(Continued)

(51) Int. Cl.
*H04L 12/18* (2006.01)
*H04L 5/00* (2006.01)
(Continued)

(52) U.S. Cl.
CPC ............ *H04L 12/18* (2013.01); *H04L 5/0048* (2013.01); *H04W 4/70* (2018.02);
(Continued)

(58) Field of Classification Search
CPC ........ H04L 12/18; H04L 5/0048; H04W 4/70; H04W 72/0446; H04W 72/30; H04W 4/06; H04W 88/02; H04W 48/08
(Continued)

(56) References Cited

U.S. PATENT DOCUMENTS 9,735,942 B2  8/2017  Xu et al.
10,284,311 B2  5/2019  Xu et al.
(Continued)

FOREIGN PATENT DOCUMENTS

KR        101354572 B1     1/2014
WO    WO-2014165838 A2    10/2014

OTHER PUBLICATIONS

"NB-IoT—Valid subframes" 3GPP TSG RAN WG1 #84-bis; R1-162781; Busan, Korea, Apr. 11-15, 2016 (Year: 2016).*

(Continued)

*Primary Examiner* — Michael Y Mapa
(74) *Attorney, Agent, or Firm* — Patterson & Sheridan LLP

(57) ABSTRACT

Aspects of the present disclosure provided techniques that for wireless communications by a user equipment (UE). An exemplary method, performed by a UE, generally includes obtaining a first system information message from a wireless network configured to utilize Multimedia Broadcast multicast service Single Frequency Network (MBSFN) subframes and non-MBSFN subframes, determining, based on the first system information message, a first set of valid subframes and a first set of non-MBSFN subframes, obtaining a second system information message from the wireless network based on the first set of valid subframes and the first set of non-MBSFN subframes, and accessing the wireless network based on the first system information message and the second system information message.

31 Claims, 7 Drawing Sheets

Related U.S. Application Data

(60) Provisional application No. 62/362,485, filed on Jul. 14, 2016.

(51) Int. Cl.
   *H04W 4/06* (2009.01)
   *H04W 4/70* (2018.01)
   *H04W 72/0446* (2023.01)
   *H04W 72/30* (2023.01)
   *H04W 88/02* (2009.01)

(52) U.S. Cl.
   CPC ....... *H04W 72/0446* (2013.01); *H04W 72/30* (2023.01); *H04W 4/06* (2013.01); *H04W 88/02* (2013.01)

(58) Field of Classification Search
   USPC .................... 370/312; 455/435.1, 450–452.2
   See application file for complete search history.

(56) References Cited

U.S. PATENT DOCUMENTS

| | | | |
|---|---|---|---|
| 11,044,111 | B2 | 6/2021 | Rico et al. |
| 2012/0198501 | A1 | 8/2012 | Ruan et al. |
| 2013/0242766 | A1* | 9/2013 | Xu .................. H04L 5/0023 370/312 |
| 2014/0071957 | A1 | 3/2014 | Xu et al. |
| 2016/0174014 | A1 | 6/2016 | You et al. |
| 2016/0294528 | A1* | 10/2016 | Kim .................. H04L 5/0007 |
| 2017/0094688 | A1* | 3/2017 | Lee .................. H04W 4/70 |
| 2017/0280404 | A1 | 9/2017 | You et al. |
| 2018/0110043 | A1 | 4/2018 | Shi et al. |
| 2021/0266873 | A1* | 8/2021 | Jiang ................ H04W 56/0015 |

OTHER PUBLICATIONS

CATT: "Clarification on MBSFN Subframe Handling for BL/CE UEs", 3GPP Draft, 3GPP TSG RAN WG1 Meeting #84bis, R1-163093, 3rd Generation Partnership Project (3GPP), Mobile Competence Centre; 650, Route Des Lucioles; F-06921 Sophia-Antipolis Cedex ; France, vol. RAN WG1, No. Busan, Korea; Apr. 11, 2016-Apr. 15, 2016, 3 Pages, Apr. 2, 2016 (Apr. 2, 2016), XP051080535, Retrieved from the Internet: URL: http://www.3gpp.org/ftp/tsg_ran/WG1_RL1/TSGR1_84b/Docs/.
Ericsson: "Scheduling Parameters for SIBs Other than SIB1-BR", 3GPP TSG RAN WG2#93, R2-161694, St. Julian's, Malta, Feb. 15-19, 2016, pp. 1-6.
Ericsson: "NB-IoT-Valid Subframes", 3GPP TSG RAN WG1 #84-bis, R1-162781, Susan, Korea, Apr. 11-15, 2016, pp. 1-3.
ETSI TS 136 213: "LTE; Evolved Universal Terrestrial Radio Access (E-UTRA); Physical Layer Procedures (3GPP TS 36.213 Version 13.5.0 Release 13)", V13.5.0 (Apr. 2017), pp. 1-389, Section 7.1.
International Search Report and Written Opinion—PCT/US2017/041597—ISA/EPO—Oct. 4, 2017.
Qualcomm Incorporated: "On Valid MBSFN Subframes and SIB2 Decoding for EMTC", 3GPP TSG RAN WG1 Meeting #86, R1-166237, Gothenburg, Sweden Aug. 22-26, 2016, 2 Pages.
Qualcomm Incorporated: "Remaining Issues for EMTC", 3GPP TSG RAN WG1 Meeting #84, R1-161103, St Julian1S, Malta, Feb. 15-19, 2016, pp. 1-3.
Rapporteur (Ericsson) W., "RAN1 Agreements for Rel-13 eMTC Sorted and Edited by Topic", 3GPP TSG RAN WG1 Meeting #84, 3GPP Draft, R1-161546, Ran1 Agreements for Rel-13 EMTC Sorted by Topic with Spec Impacts—with Change Tracking, 3rd Generation Partnership Project (3GPP), Mobile Competence Centre, 650, Route Des Luc, vol. RAN WG1, No. St Julian's, Malta, Feb. 15, 2016-Feb. 19, 2016, Feb. 24, 2016 (Feb. 24, 2016, 44 pages, XP051079451, Retrieved from the Internet: URL: http://www.3gpp.org/ftp/tsg_ran/WG1_RL1/TSGR1_84/Docs/ [retrieved on Feb. 24, 2016].
Samsung: "Dedicated Signalling of SI in Rel-13 eMTC", 3GPP Draft,3GPP TSG-RAN WG2 Meeting #94, R2-163454, 3rd Generation Partnership Project (3GPP), Mobile Competence Centre; 650, Route Des Lucioles; F-06921 Sophia Antipolis Cedex; France, vol. RAN WG2, No. Nanjing, China, May 23, 2016-May 27, 2016, 4 pages, May 22, 2016, XP051104955, Retrieved from the Internet: URL: http://www.3gpp.org/ftp/Meetings_3GPP_SYNC/RAN2/Docs/ [retrieved on May 22, 2016] SIB Acquisition for MTC devices in MBSFN; Reception of SIB1 and SIB2; SIB2 includes mbsfn-subframeconfiglist.
European Search Report—EP24168898—Search Authority—The Hague—Aug. 28, 2024.

* cited by examiner

SUBFRAME VALIDITY AND SYSTEM INFORMATION RECEPTION FOR MACHINE TYPE COMMUNICATION

CROSS-REFERENCE TO RELATED APPLICATION(S)

The present Application for Patent is a Continuation of U.S. Non-Provisional patent application Ser. No. 15/646,018, filed Jul. 10, 2017, which claims benefit of U.S. Provisional Patent Application Ser. No. 62/362,485, filed Jul. 14, 2016, each of which is assigned to the assignee hereof and hereby expressly incorporated by reference herein.

BACKGROUND

I. Field of the Disclosure

Certain aspects of the present disclosure generally relate to wireless communications and, more particularly, to subframe validity and system information block (SIB) reception for certain wireless devices, such as machine type communication (MTC) devices.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that may support communication for a number of wireless devices. Wireless devices may include user equipments (UEs). Some UEs may be considered machine-type communication(s) (MTC) or enhanced MTC (eMTC) UEs. MTC (e.g., eMTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance SIB acquisition of MTC devices with coverage enhancement (CE) for MTC services when it is unknown whether a network is configured with Multimedia Broadcast Multicast Service (MBMS) or Multimedia Broadcast multicast service Single Frequency Network (MBSFN), or Multimedia Broadcast Single Frequency Network, or Multicast Broadcast Single Frequency Network) the bandwidth and mode of the network may be used to determine a timing for acquiring system data.

SUMMARY

Certain aspects of the present disclosure provide techniques and apparatus for subframe validity and SIB2 reception in MTC UEs.

Certain aspects of the present disclosure provide a method for wireless communications by a user equipment (UE). The method generally includes: obtaining a first system information message from a wireless network configured to utilize MBSFN subframes and non-MBSFN subframes; determining, based on the first system information message, a first set of valid subframes and a first set of non-MBSFN subframes; obtaining a second system information message from the wireless network based on the first set of valid subframes and the first set of non-MBSFN subframes; and accessing the wireless network based on the first system information message and the second system information message.

Certain aspects of the present disclosure provide an apparatus including at least one processor and a memory coupled to the at least one processor with instructions stored thereon. The at least one processor is configured to: obtain a first system information message from a wireless network configured to utilize MBSFN subframes and non-MBSFN subframes; determine, based on the first system information message, a first set of valid subframes and a first set of non-MBSFN subframes; obtain a second system information message from the wireless network based on the first set of valid subframes and first set of non-MBSFN subframes; and access the wireless network based on the first system information message and the second system information message.

Certain aspects of the present disclosure provide a method for wireless communications by a base station (BS). The method generally includes: transmitting, in a network configured to utilize MBSFN subframes and non-MBSFN subframes, a first system information message from which a first set of valid subframes and a first set of non-MBSFN subframes may be inferred; transmitting a second system information message; and communicating with a user equipment (UE) based on the first system information message and the second system information message.

Certain aspects of the present disclosure provide an apparatus including at least one processor and a memory coupled to the at least one processor with instructions stored thereon. The at least one processor is configured to: transmit, in a network configured to utilize MBSFN subframes and non-MBSFN subframes, a first system information message from which a first set of valid subframes and a first set of non-MBSFN subframes may be inferred; transmit a second system information message; and communicate with a user equipment (UE) based on the first system information message and the second system information message.

Numerous other aspects are provided including methods, apparatus, systems, computer program products, and processing systems.

DETAILED DESCRIPTION

Aspects of the present disclosure provide techniques that may help enable efficient communication between a base station and machine type communication (MTC) based user equipments (UEs). For example, the techniques may provide.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
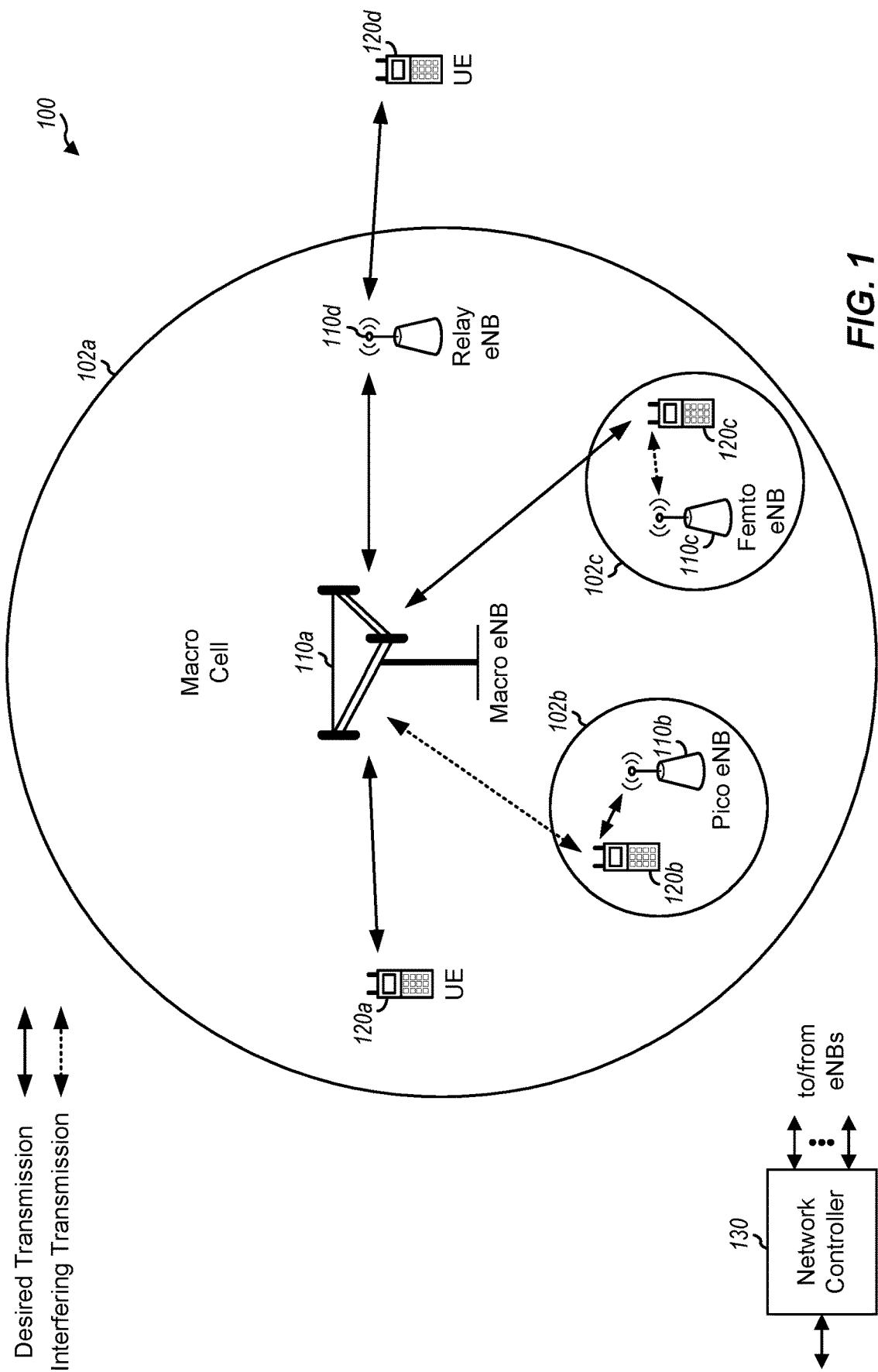
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" may refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that may receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, smart phone, a personal digital assistant (PDA), a wireless modem, a wireless communication device, a handheld device, a wireless modem, a laptop computer, a cordless phone, a wireless local loop (WLL) station, a tablet, a laptop computer, a netbook, a smartbook, an ultrabook, wearables (e.g., smart watch, smart bracelet, smart glasses, virtual reality goggles, smart ring, smart clothing), gaming devices, entertainment devices, cameras, music players, medical/healthcare devices, vehicular devices, navigation/positioning devices, etc. MTC UEs may include remote devices, such as drones, robots/robotic devices, sensors, meters, cameras, monitors, location tags, etc., that may communicate with a base station, another remote device, or some other entity. MTC devices, as well as other types of devices, may include internet of everything (IoE) or internet-of-things (IoT) devices, such as NB-IoT (narrowband internet-of-things) devices, and techniques disclosed herein may be applied to MTC devices, NB-IoT devices, as well as other devices. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an CNB.

Figure 2:
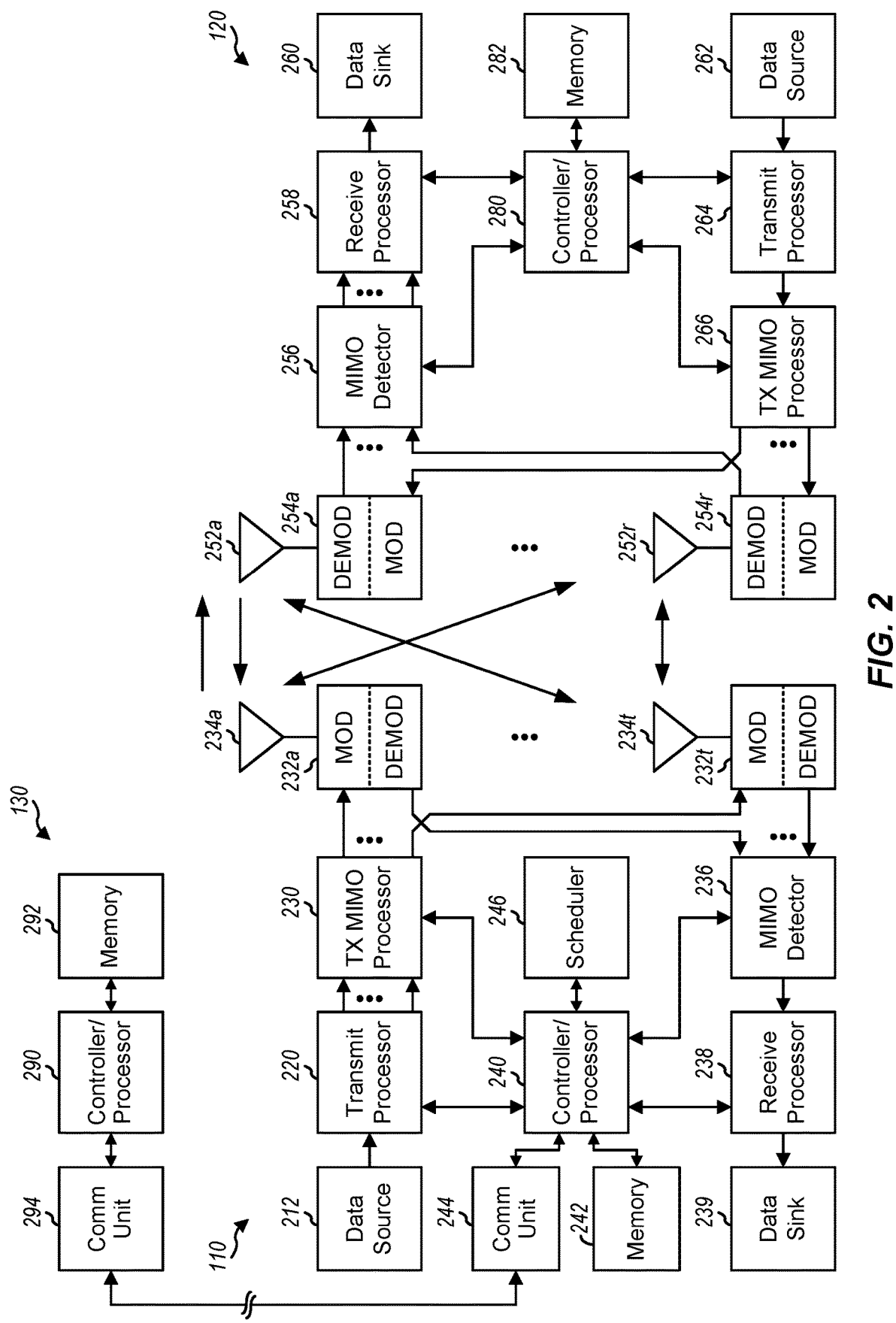
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) the demodulator's received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports including RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 240 and/or other processors and/or modules at base station 110 may perform direct operations 700 shown in FIG. 7. Processor 280 and/or other processors and/or modules at UE 120, may perform or direct operations 600 shown in FIG. 6. Memories 242 and 282 may store data and program codes for base station 110 and UE 120, respectively. A scheduler 246 may schedule UEs for data transmission on the downlink and/or uplink.

Figure 3:
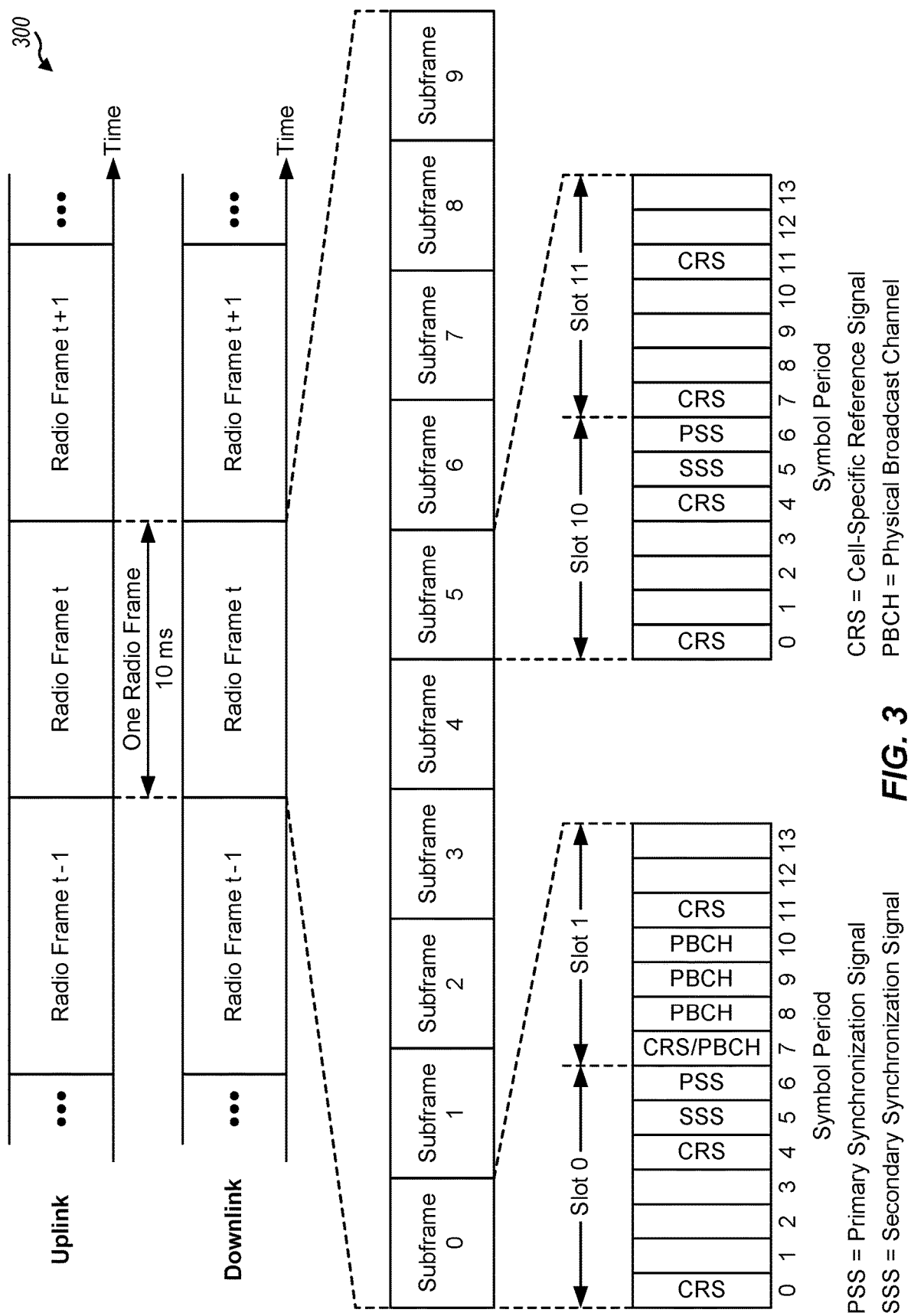
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
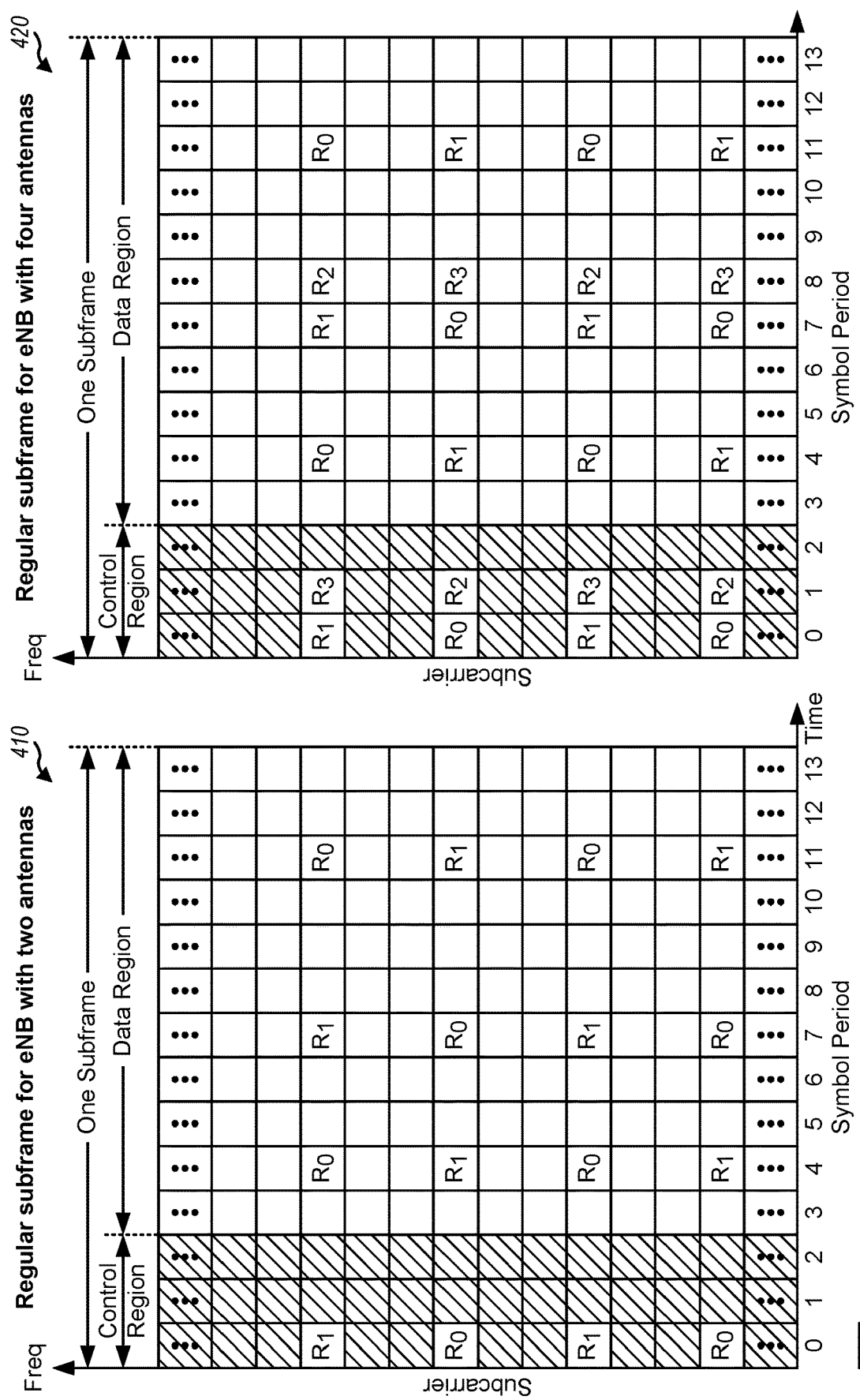
FIG. 4 is a block diagram conceptually illustrating two exemplary subframe formats with the normal cyclic prefix

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on the CRSs' cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

An evolved MBMS in a Multimedia Broadcast multicast service Single Frequency Network (MBSFN) may be formed by the eNBs in a cell to form a MBSFN area. ENBs may be associated with multiple MBSFN areas, for example, up to a total of eight MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Thus a first MBSFN area may support a first eMBMS broadcast service, such as by providing a particular news broadcast to UE and a second MBSFN area may support a second eMBMS broadcast service, such as by providing a different news broadcast to second UE. Each MBSFN area supports a plurality of physical multicast channels (PMCH) (e.g., 15 PMCHs).

Each PMCH corresponds to a multicast channel (MCH). Each MCH may multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

The subframes configured to carry the MBSFN information may vary depending on the diversity mode of the cell. In general, MBSFN may be carried in all subframes except those only available for DL to the UE and special subframes. For example, where the cell is configured for FDD, MBSFN may be configured in all subframes except 0, 4, 5, and 9. For TDD operations, MBSFN may be configured in all subframes except 0, 1, 5, and 6, as subframes 1 and 6 are special subframes and subframes 0 and 5 are DL subframes in TDD.

The focus of traditional LTE design (e.g., for legacy "non MTC" devices) is on the improvement of spectral efficiency, ubiquitous coverage, and enhanced quality of service (QOS) support. Current LTE system downlink (DL) and uplink (UL) link budgets are designed for coverage of high end devices, such as state-of-the-art smartphones and tablets, which may support a relatively large DL and UL link budget.

However, low cost, bandwidth reduced low complexity (BL), low rate devices may be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 us for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the MTC may be limited to a particular narrowband assignment (e.g., of no more than six resource blocks (RBs)) within the available system bandwidth. However, the MTC may be able to re-tune (e.g., operate and/or camp) to different narrowband regions within the available system bandwidth of the LTE system, for example, in order to co-exist within the LTE system.

As another example of coexistence within the LTE system, MTCs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the MTC may be able to receive the legacy PBCH with one or more additional repetitions of the PBCH across multiple subframes. As another example, the MTC may be able to transmit one or more repetitions of PRACH (e.g., with one or more PRACH formats supported) to an eNB in the LTE system. The PRACH may be used to identify the MTC. Also, the number of repeated PRACH attempts may be configured by the eNB.

The MTC may also be a link budget limited device and may operate in different modes of operation (e.g. entailing different amounts of repeated messages transmitted to the MTC) based on the MTC's link budget limitation. For example, in some cases, the MTC may operate in a normal coverage mode in which there is little to no repetition (e.g., the amount of repetition needed for the UE to successfully receive a message may be low or repetition may not even be needed).

In some cases, the MTC may operate in a coverage enhancement (CE) mode in which there may be high amounts of repetition. Examples of coverage enhancement techniques may include repetition within subframes, repetition across different subframes, repetition of various channels, power boosting, and spatial multiplexing. For example, for a 328 bit payload, a MTC in CE mode may use 150 or more repetitions of the payload in order to successfully receive the payload.

In some cases, e.g., also for LTE Rel-13, the MTC may have limited capabilities with respect to the MTC's reception of broadcast and unicast transmissions. For example, the maximum transport block (TB) size for a broadcast transmission received by the MTC may be limited to 1000 bits. Additionally, in some cases, the MTC may not be able to receive more than one unicast TB in a subframe. In some cases (e.g., for both the CE mode and normal mode described above), the MTC may not be able to receive more than one broadcast TB in a subframe. Further, in some cases, the MTC may not be able to receive both a unicast TB and a broadcast TB in a subframe.

MTCs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-MTCs. For example, as compared to conventional paging messages used in LTE, MTCs may able to monitor and/or receive paging messages that non-MTCs may not able to monitor and/or receive. Similarly, as compared to conventional random access response (RAR) messages used in a conventional random access procedure, MTCs may be able to receive RAR messages that also may not be able to be received by non-MTCs. The new paging and RAR messages associated with MTCs may also be repeated one or more times (e.g., "bundled"). In addition, different numbers of repetitions (e.g., different bundling sizes) for the new messages may be supported.

Figure 5:
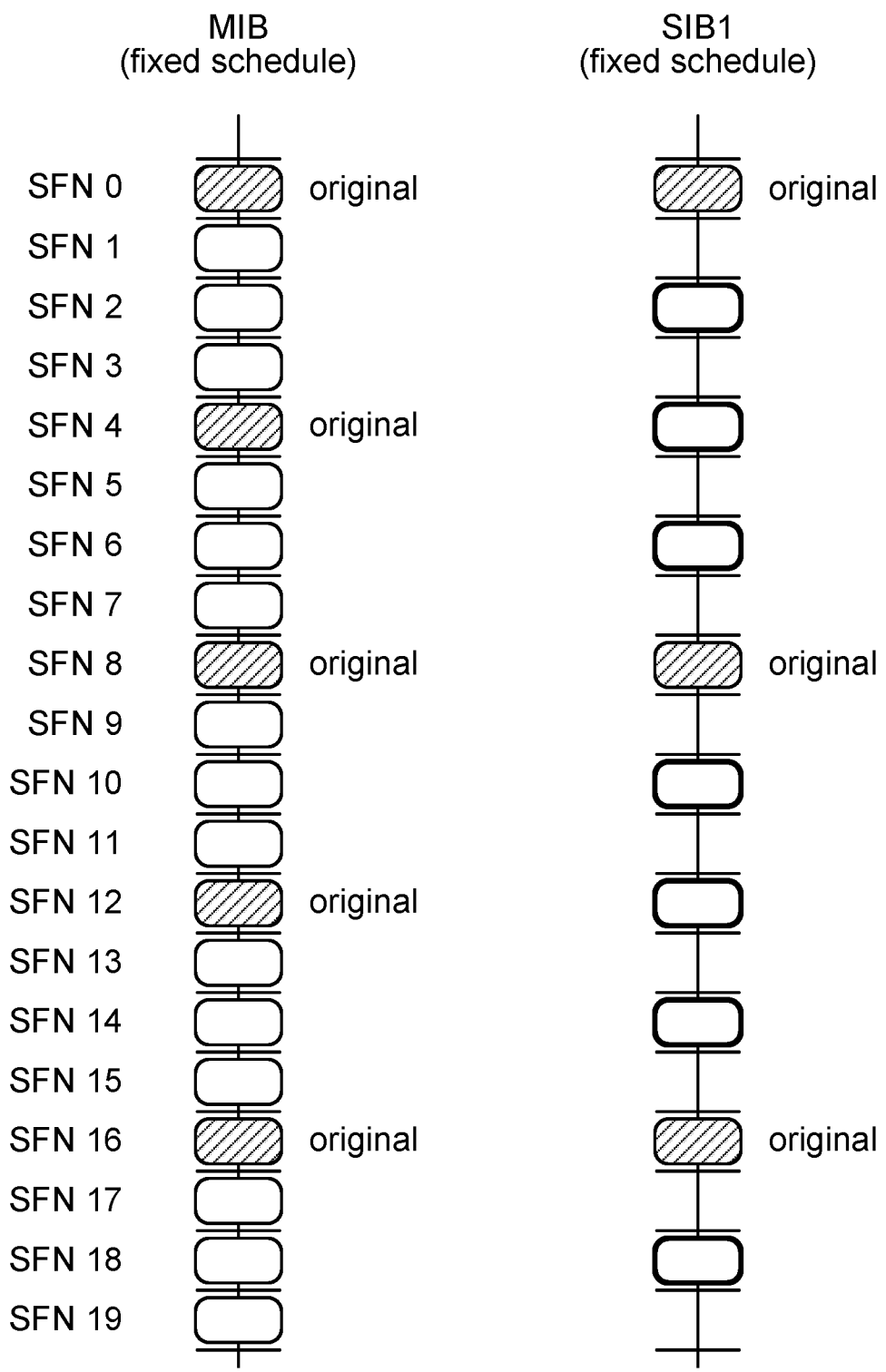
FIG. 5 illustrates an example of SIB scheduling, in accordance with certain aspects of the present disclosure.

The wireless network may utilize a master information block (MIB) to establish a connection with and convey important system information to the UEs. The MIB is broadcast by a wireless node, such as an eNB, for example. The MIB may contain basic information for initially attaching to a cell. During cell acquisition, the UE detects and reads the MIB to acquire information necessary for camping on a cell. As illustrated in FIG. 5, a new MIB is broadcast every four radio frames, for example at subframes 0, 4, 8, 12, and 16. Copies of the MIB are broadcast every radio frame, for example where the MIB broadcast at subframes 1-3 are copies of the MIB broadcast at subframe 0.

There are many defined types of SIB messages (e.g., SIBs), SIB1, SIB2, SIB3, etc., each carrying various types of system information (SI). Generally, SI messages contain critical broadcast information and decoded information carried in various MIB and SIB messages that may be provided for initial attach, handover, cell reselection, and monitoring for critical information, such as earthquake and tsunami warning service (ETWS) or commercial mobile alert system (CMAS).

Each SIB may be broadcast on a schedule that is defined by a schedule carried in the system information block type 1 (SIB1). Similar to the MIB, the SIB1, as seen in FIG. 5, may be broadcast on a fixed schedule every 8 radio frames for a periodicity of 80 ms and repetitions are made within the 80 ms, for example. For example, the first transmission of SIB1 may be scheduled in subframe number (SFN) 5 of radio frames for which the SFN mod 8=0, and repetitions may be scheduled in SFN 5 of all other radio frames for which SFN mod 2=0. That is, a new SIB1 is sent every 8 frames or 80 ms and within the 80 ms period, the same SIB1 is repeated every 2 frames or 20 ms. The repetitions may each include a different redundancy version (RV), but are otherwise the same, for example. For eMTC, a separate SIB1 may be transmitted with more repetitions and/or longer modification period. The UE may combine the repetitions to calculate a LLR for use in decoding the combined repetitions. Based on the information in a decoded SIB1, the UE may determine a schedule for when other SIB messages, such as SIB2. SIB3, etc., will be broadcast.

The wireless network may support valid and invalid subframes for transmission and reception of physical channels for certain types or classes of UEs. For example, certain subframes may be designated as valid or invalid subframes, for example using a subframe mask transmitted in SIB1 to an eMTC device. Invalid subframes may be used for a variety of reasons, including for increased compatibility, for example avoiding collisions with wideband UEs using semi-persistent scheduling (SPS) or legacy PRACH.

The wireless network may also be configured to support MBSFN subframes. For example, a network configured for MBSFN may include MBSFN subframes carrying a physical multicast channel (PMCH) broadcast transmissions by multiple base stations to create a SFN area. These MBSFN subframes carrying PMCH broadcasts may be marked as invalid subframes as these subframes cannot contain PDSCH and cMTC devices should not expect to receive data in these subframes. MBSFN subframes may also be used for PDSCH transmissions by a single cell without a cell-specific reference signal for use by eMTC devices using transmission mode 9. These subframes may be valid subframes for eMTC devices.

Radio layer 1 defined the expected behavior for valid MBSFN subframes for transmission mode 9. However, from a radio layer 2 perspective, all valid subframes are non-MBSFN subframes. For example, as indicated in TS 36.213, fdd-DownlinkOrTddSubframeBitmapBR defines the set of valid subframes for FDD downlink (DL) or TDD transmissions as a subset of non-MBSFN subframes indicated in mbsfn-SubframeConfigList. Accordingly, the set of valid subframes is a set of valid non-MBSFN subframes. Where the field is not present, all subframes are considered as valid subframes for FDD DL transmission, and all DL subframes, per the uplink (UL)/DL configuration, are considered valid subframes for TDD DL transmission.

Additionally, where the set of valid subframes is expanded to include MBSFN subframes, a valid/invalid mask may be received in SIB1, while a MBSFN mask may be received in SIB2. SIB1 is generally received during set intervals without MBSFN subframes present. SIB2 is transmitted with a CRS based modes and MSBFN subframes may be present. However, while trying to receive and decode SIB2, a UE will not know whether any particular subframe is a MBSFN subframe as the MBSFN mask is transmitted in SIB2.

Figure 6:
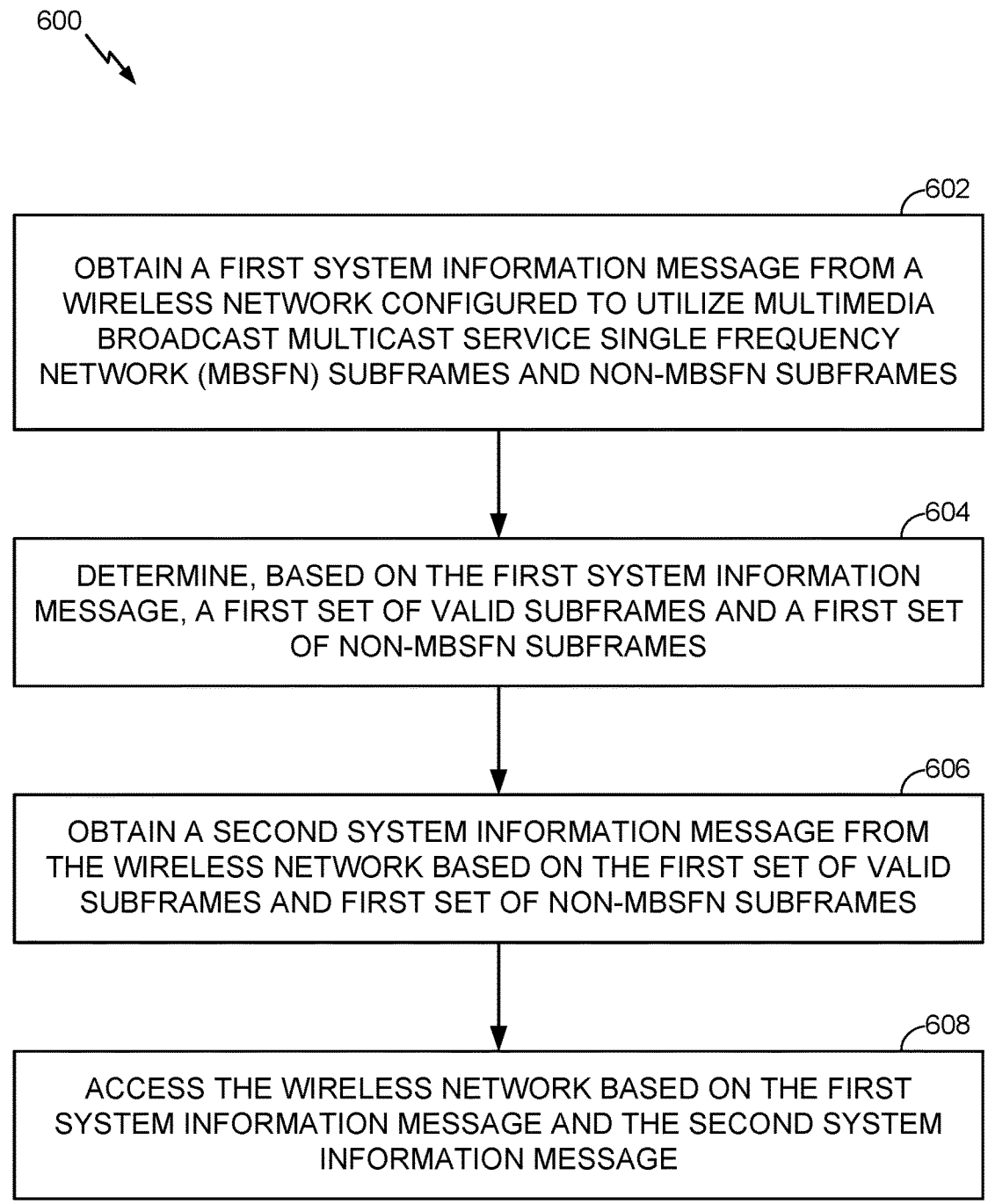
FIG. 6 illustrates example operations 600 that may be performed, e.g., by a user equipment in accordance with certain aspects of the present disclosure.

FIG. 6 illustrates example operations 600 that may be performed by a user equipment. The operations 600 may begin at 602 by obtaining a first system information message from a wireless network configured to utilize MBSFN subframes and non-MBSFN subframes. At 604, determining, based on the first system information message, a first set of valid subframes and a first set of non-MBSFN subframes. At 606, obtaining a second system information message from the wireless network based on the first set of valid subframes and first set of non-MBSFN subframes. At 608, accessing the wireless network based on the first system information message and the second system information message.

According to aspects of the present disclosure, the method may also include operations such as, for example, obtaining, from the second system information message, a second set of valid subframes and/or non-MBSFN subframes. Further, in one or more cases, accessing the wireless network may be based on the second set of valid subframes.

According to one or more cases, example operations as shown in FIG. 6 may include receiving the first system information message and/or second system information message in a transmission within a narrowband region having a cell-specific reference signal around the narrowband region.

Figure 7:
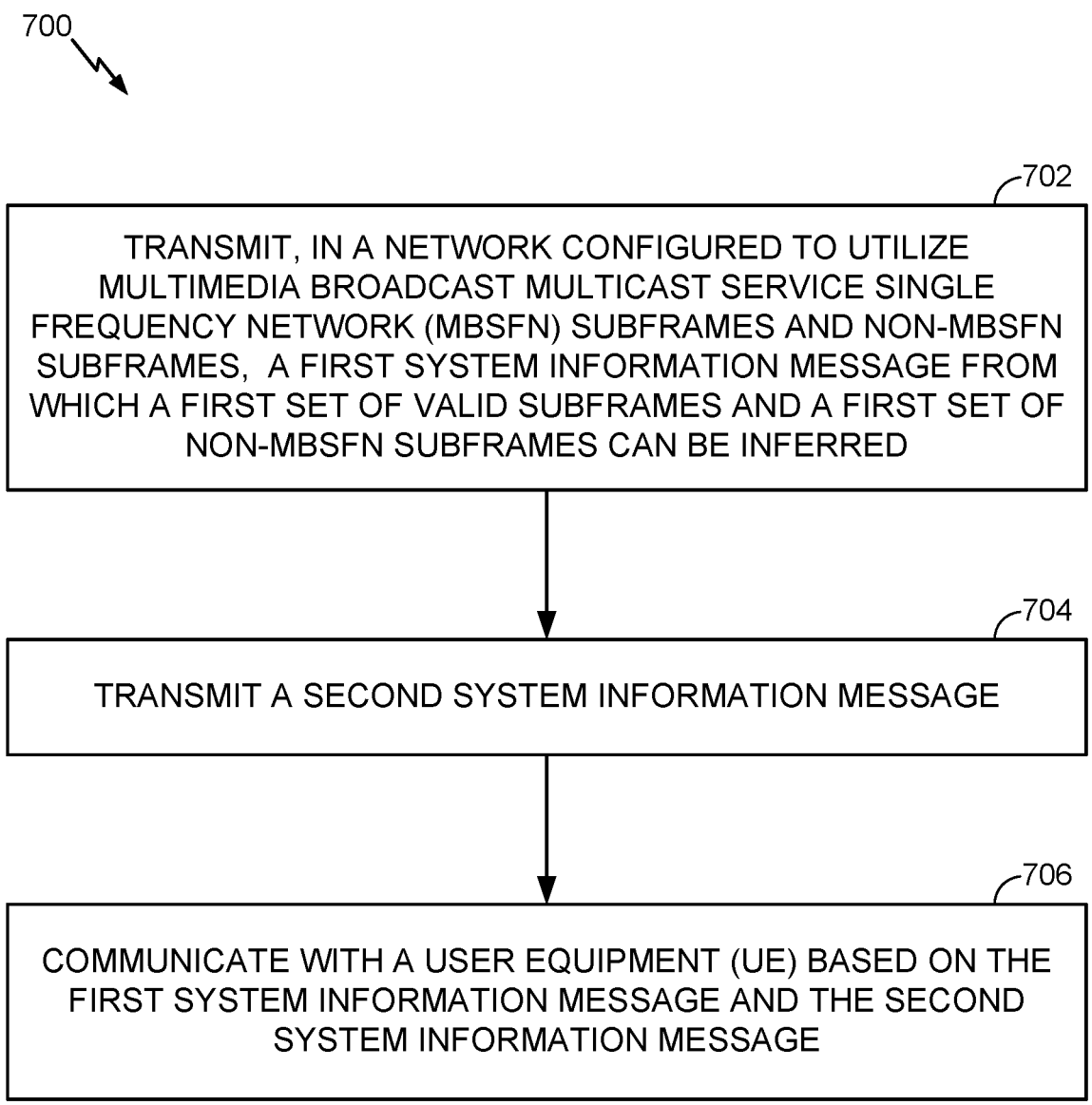
FIG. 7 illustrates example operations 700 that may be performed, e.g., by a base station in accordance with certain aspects of the present disclosure.

FIG. 7 illustrates example operations 700 that may be performed by a user equipment. The operations 700 may begin at 702 by transmitting, in a network configured to utilize MBSFN subframes and non-MBSFN subframes, a first system information message from which a first set of valid subframes and a first set of non-MBSFN subframes may be inferred. At 704, transmitting a second system information message. At 706, communicating with a user equipment (UE) based on the first system information message and the second system information message.

According to aspects of the present disclosure, an eMTC UE may be configured to assume that all subframes in which a SIB2 are transmitted are non-MBSFN subframes. Alternatively or in addition the eMTC UE may assume that a subset of, or all SI messages, such as those carried in SIB2, SIB3, etc. are transmitted in non-MBSFN subframes. By assuming that SI messages are transmitted in non-MBSFN subframes, the UE may rely on the valid/invalid mask from SIB1 even absent the MBSFN mask from SIB2.

According to aspects of the present disclosure, the eNB may be configured to schedule and transmit SI messages, such as SIB2, outside of MBSFN subframes. This schedule may be broadcast in, for example, SIB1.

According to aspects of the present disclosure, SI messages, such as SIB2, may be transmitted in subframes that cannot be configured for MBSFN, such as subframes 0/4/5/9 in FDD. Schedules for SI messages may be windows, for example 20 subframes long, where the SI messages are broadcast within a valid subframe of the window. During this window, the SI message would be broadcast and the UE may be configured to listen for SI messages on those subframes that cannot be configured for MBSFN. According to one or more cases, the second system information message may be scheduled based on a set of subframes that cannot be configured for MBSFN.

According to aspects of the present disclosure, an additional valid/invalid mask may be included in a SIB2 field, in addition to the valid/invalid mask in SIB1. The valid/invalid mask included in the SIB1 may then indicate the valid/invalid and MBSFN subframe configuration for the purposes of decoding SIB2 and may be overridden by the SIB2 field after the SIB2 is received and decoded. This SIB2 field may be optional.

According to aspects of the present disclosure, multiple masks may be included in SIB1. For example, a MBSFN mask may be included in SIB1 instead of SIB2. Alternatively, the MBSFN mask in SIB1 may be additional to the MBSFN mask included in SIB2. The MBSFN mask included in SIB1 may be used exclusively for certain classes of devices, such as eMTC devices, while the MBSFN mask included in SIB2 may be the same as the one transmitted to wideband devices.

As another example of multiple masks included in SIB1, according to aspects of the present disclosure, a mask, in addition to the valid/invalid mask, may be included in SIB1. This additional mask may indicate, to an eMTC UE receiving the SIB1, the valid subframes for non-MBSFN SIB2 decoding, while the valid/invalid mask may be used for decoding other SI messages. The bit-width of the additional mask may be smaller than that of the valid/invalid mask, for example indicating that all subframes are valid in FDD. This additional mask may be optional and eMTC UEs may assume that all valid subframes are non-MBSFN subframes in the absence of this additional mask.

According to aspects of the present disclosure, an eMTC UE may assume that subframes containing SIB2 include a CRS. Generally, a UE assumes that there is no CRS included with MSBFN subframes. However, nothing precludes the inclusion of a CRS with the MSBFN subframe and an eNB may insert CRS in MSBFN subframes containing SIB2, and the SIB2 may rate match around the CRS. Wideband or legacy devices may receive the MSBFN subframe and ignore the CRS. Other transmissions, such as TM9 (transmission mode 9) transmissions, if present, may be punctured by the CRS.

According to certain aspects, the CRS may be a narrowband CRS. The eMTC may, for decoding SIB2, assume that there is a CRS around the narrowband PRBs used for transmitting the SIB2 of the MSBSFN subframe. Here, around the narrowband may refer to the 6 PRBs in the narrowband or the 6 PRBs in the narrowband plus m additional PRBs at each side of the narrowband. For example, a 20 MHz cell may have over a hundred available PRBs, six of which may be used to carry the SIB2. It may not be necessary to for the CRS to take up the rest of the PRBs of the 20 MHz cell. Rather, the CRS may be carried in additional PRBs at each side of the narrowband. When a CRS occupies one additional PRB at each side of the narrowband, a total of 8 PRBs are used with 6 PRBs containing the SIB2 along with two additional CRS PRBs on each side of the SIB2. Where the narrowband is located close to or at the edge of the bandwidth, a CRS may not be included on both sides of the SIB2 to avoid creating out of band emissions.

The methods disclosed herein include one or more steps or actions for achieving the described method of wireless communications. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for obtaining a first or second system information messages, means for determining a first set of valid subframes and a first set of non-MBSFN subframes, means for accessing the wireless network, means for transmitting first or second system information messages, and/or means for communicating with a user equipment may include one or more processors, such as the receive processor 258 and/or the controller/processor 280 of the UE 120 illustrated in FIG. 2 and/or the transmit processor 220 and/or the controller/processor 240 of the base station 110 illustrated in FIG. 2. Means for receiving may include a receive processor (e.g., the receive processor 258) and/or an antenna(s) 252 of the user terminal 120 illustrated in FIG. 2. Means for transmitting may include a transmit processor (e.g., the transmit processor 220) and/or an antenna(s) 234 of the eNB 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but the disclosure is to be accorded the widest scope consistent with the principles and novel features disclosed herein.

The invention claimed is:

1. A method for wireless communications by a user equipment (UE), comprising:
    obtaining a first system information message from a wireless network configured to utilize Multimedia Broadcast multicast service Single Frequency Network (MBSFN) subframes and non-MBSFN subframes, wherein the first system information message includes;
        a schedule indicating at least when a second system information message will be broadcast; and
        a subframe mask indicating a first set of valid subframes, including a first set of non-MBSFN subframes, for frequency division duplexing (FDD) or time division duplexing (TDD) transmissions;
    obtaining, based on the schedule, the second system information message from the wireless network via one or more subframes within the first set of valid subframes, wherein the second system information message includes an MBSFN mask indicating a second set of non-MBSFN subframes; and
    accessing the wireless network based on the first set of valid subframes and the second set of non-MBSFN subframes.

2. The method of claim 1, wherein the second system information message is scheduled based on the first set of non-MBSFN subframes.

3. The method of claim 1, further comprising determining, from the second system information message, a second set of valid subframes including the second set of non-MBSFN subframes and wherein accessing the wireless network is based on the second set of valid subframes.

4. The method of claim 1, wherein the first system information message includes an additional subframe mask indicating the first set of non-MBSFN subframes.

5. The method of claim 3, wherein the first set of non-MBSFN subframes comprises a set of valid non-MBSFN subframes for decoding the second system information message.

6. The method of claim 1, wherein the second system information message is scheduled based on a set of subframes that cannot be configured for MBSFN.

7. The method of claim 1, wherein at least one of:
    obtaining the first system information message comprises receiving the first system information message in a transmission within a narrowband region having a cell-specific reference signal around the narrowband region; or
    obtaining the second system information message comprises receiving the second system information message in a transmission within a narrowband region having a cell-specific reference signal around the narrowband region.

8. The method of claim 7, further comprising scheduling the second system information message based on the first set of non-MBSFN subframes.

9. The method of claim 1, wherein the first set of valid subframes comprise valid subframes for downlink transmissions for bandwidth reduced UEs.

10. A method of wireless communications by a base station (BS), comprising:
    transmitting, in a network configured to utilize Multimedia Broadcast multicast service Single Frequency Network (MBSFN) subframes and non-MBSFN subframes, a first system information message including:
        a schedule indicating at least when a second system information message will be broadcast; and
        a subframe mask indicating a first set of valid subframes, including a first set of non-MBSFN subframes, for frequency division duplexing (FDD) or time division duplexing (TDD) transmissions;
    transmitting, based on the schedule, the second system information message via one or more subframes within the first set of valid subframes, wherein the second system information message includes an MBSFN mask indicating a second set of non-MBSFN subframes; and
    communicating with a user equipment (UE) based on the first set of valid subframes and the second set of non-MBSFN subframes.

11. The method of claim 10, wherein the first system information message includes an additional subframe mask indicating the first set of non-MBSFN subframes.

12. The method of claim 11, wherein the first set of non-MBSFN subframes comprises a set of valid non-MBSFN subframes for decoding the second system information message.

13. The method of claim 10, further comprising:
    scheduling the second system information message based on a set of subframes that cannot be configured for MBSFN.

14. The method of claim 10, wherein the first system information message and/or the second system information message is transmitted within a narrowband region having a cell-specific reference signal around the narrowband region.

15. An apparatus for wireless communications, comprising:
    means for obtaining a first system information message from a wireless network configured to utilize Multimedia Broadcast multicast service Single Frequency Network (MBSFN) subframes and non-MBSFN subframes, wherein the first system information message includes:
        a schedule indicating at least when a second system information message will be broadcast; and
        a subframe mask indicating a first set of valid subframes, including a first set of non-MBSFN subframes, for frequency division duplexing (FDD) or time division duplexing (TDD) transmissions;

means for obtaining, based on the schedule, the second system information message from the wireless network via one or more subframes within the first set of valid subframes, wherein the second system information includes an MBSFN mask indicating a second set of non-MBSFN subframes; and means for accessing the wireless network based on the first set of valid subframes and the second set of non-MBSFN subframes.

16. The apparatus of claim 15, wherein the second system information message is scheduled based on the first set of non-MBSFN subframes.

17. The apparatus of claim 15, further comprising means for determining, from the second system information message, a second set of valid subframes including the second set of non-MBSFN subframes and wherein accessing the wireless network is based on the second set of valid subframes.

18. The apparatus of claim 15, wherein the first system information message includes an additional subframe mask indicating the first set of non-MBSFN subframes.

19. The apparatus of claim 18, wherein the first set of non-MBSFN subframes comprises a set of valid non-MBSFN subframes for decoding the second system information message.

20. The apparatus of claim 15, wherein the second system information message is scheduled based on a set of subframes that cannot be configured for MBSFN.

21. The apparatus of claim 15, wherein the means for obtaining the first system information message and/or the second system information message further comprises means for receiving the first system information message and/or the second system information message in a transmission within a narrowband region having a cell-specific reference signal around the narrowband region.

22. An apparatus for wireless communications, comprising:
    means for transmitting, in a network configured to utilize Multimedia Broadcast multicast service Single Frequency Network (MBSFN) subframes and non-MBSFN subframes, a first system information message including:
        a schedule indicating at least when a second system information message will be broadcast; and
        a subframe mask indicating a first set of valid subframes, including a first set of non-MBSFN subframes, for frequency division duplexing (FDD) or time division duplexing (TDD) transmissions;
    means for transmitting a second system information message via one or more subframes within the first set of valid subframes, wherein the second system information message includes an MBSFN mask indicating a second set of non-MBSFN subframes;
    means for communicating with a user equipment (UE) based on the first set of valid subframes and the second set of non-MBSFN subframes.

23. The apparatus of claim 22, further comprising means for scheduling the second system information message based on the first set of non-MBSFN subframes.

24. The apparatus of claim 22, wherein the first system information message includes an additional subframe mask indicating the first set of non-MBSFN subframes.

25. The apparatus of claim 24, wherein the first set of non-MBSFN subframes comprises a set of valid non-MBSFN subframes for decoding the second system information message.

26. The apparatus of claim 22, further comprising means for scheduling the second system information message based a set of subframes that cannot be configured for MBSFN.

27. The apparatus of claim 22, wherein the first system information message and/or the second system information message is transmitted within a narrowband region having a cell-specific reference signal around the narrowband region.

28. An apparatus for wireless communications by a user equipment (UE), comprising:
    one or more processors individually or collectively configured to execute instructions stored on one or more memories and to cause the UE to:
        obtain a first system information message from a wireless network configured to utilize Multimedia Broadcast multicast service Single Frequency Network (MBSFN) subframes and non-MBSFN subframes, wherein the first system information message includes:
            a schedule indicating at least when a second system information message will be broadcast; and
            a subframe mask indicating a first set of valid subframes, including a first set of non-MBSFN subframes, for frequency division duplexing (FDD) or time division duplexing (TDD) transmissions;
        obtain, based on the schedule, the second system information message from the wireless network via one or more subframes within the first set of valid subframes, wherein the second system information message includes an MBSFN mask indicating a second set of non-MBSFN subframes; and
        access the wireless network based on the first set of valid subframes and the second set of non-MBSFN subframes.

29. An apparatus for wireless communications by a base station (BS), comprising:
    one or more processors individually or collectively configured to execute instructions stored on one or more memories and to cause the BS to:
        transmit, in a network configured to utilize Multimedia Broadcast multicast service Single Frequency Network (MBSFN) subframes and non-MBSFN subframes, a first system information message including:
            a schedule indicating at least when a second system information message will be broadcast; and
            a subframe mask indicating a first set of valid subframes, including a first set of non-MBSFN subframes, for frequency division duplexing (FDD) or time division duplexing (TDD) transmissions;
        transmit, based on the schedule, the second system information message via one or more subframes within the first set of valid subframes; and
        communicate with a user equipment (UE) based on the first set of valid subframes and the second set of non-MBSFN subframes.

30. A non-transitory computer-readable medium for wireless communications by a user equipment (UE), the non-transitory computer-readable medium comprising instructions executable by one or more processors to cause the UE to:
    obtain a first system information message from a wireless network configured to utilize Multimedia Broadcast multicast service Single Frequency Network (MBSFN)

subframes and non-MBSFN subframes, wherein the first system information message includes:
  a schedule indicating at least when a second system information message will be broadcast; and
  a subframe mask indicating a first set of valid subframes, including a first set of non-MBSFN subframes, for frequency division duplexing (FDD) or time division duplexing (TDD) transmissions;
obtain, based on the schedule, the second system information message from the wireless network via one or more subframes within the first set of valid subframes, wherein the second system information message includes an MBSFN mask indicating a second set of non-MBSFN subframes; and
access the wireless network based on the first set of valid subframes and the second set of non-MBSFN subframes.

31. A non-transitory computer-readable medium for wireless communications by a base station (BS), the non-transitory computer-readable medium comprising instructions executable by one or more processors to cause the BS to:

transmit, in a network configured to utilize Multimedia Broadcast multicast service Single Frequency Network (MBSFN) subframes and non-MBSFN subframes, a first system information message including:
  a schedule indicating at least when a second system information message will be broadcast; and
  a subframe mask indicating a first set of valid subframes, including a first set of non-MBSFN subframes, for frequency division duplexing (FDD) or time division duplexing (TDD) transmissions;
transmit, based on the schedule, the second system information message via one or more subframes within the first set of valid subframes, wherein the second system information message includes an MBSFN mask indicating a second set of non-MBSFN subframes; and
communicate with a user equipment (UE) based on the first set of valid subframes and the second set of non-MBSFN subframes.

* * * * *